United States Patent Office 3,425,713
Patented Feb. 4, 1969

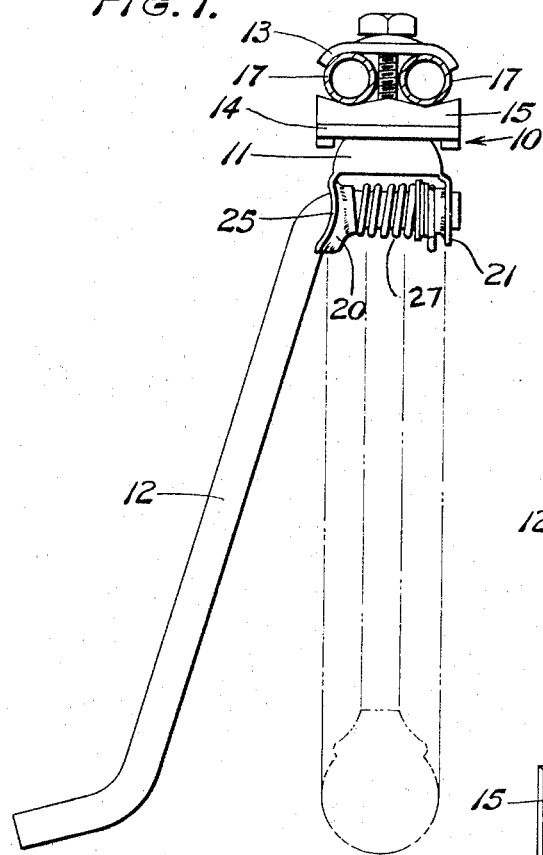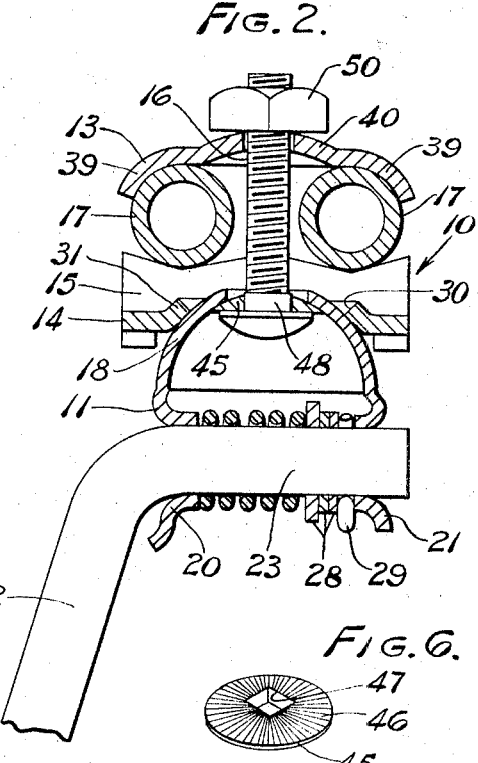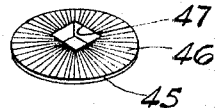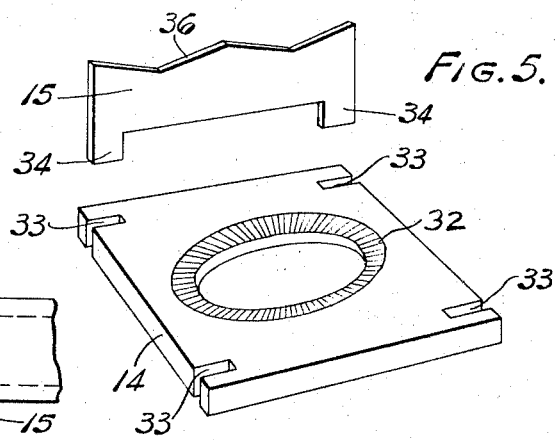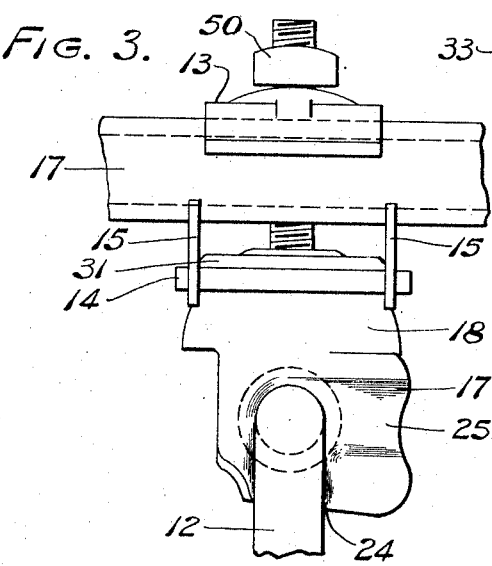

3,425,713
BICYCLE KICKSTAND
Herbert J. McCauley, 86 Dana Road,
Buffalo, N.Y. 14216
Filed Oct. 12, 1966, Ser. No. 586,169
U.S. Cl. 280—301                              11 Claims
Int. Cl. B62h 1/02

ABSTRACT OF THE DISCLOSURE

A bicycle kickstand having clamp members for attachment to the rear fork of a bicycle frame and a bearing for rotatably receiving the upper end of a support arm for rotation on a generally horizontal axis to and from supporting position. A ball and socket joint between the lower clamp member and the bearing permits the lower bearing to be rotatably adjusted on any desired horizontal axis and also about a vertical axis. The attaching clamp screw also fixes the adjustment of the bearing with respect to the clamp means.

---

This invention relates to a bicycle kickstand of the type having a support arm pivotable between a downwardly and outwardly projecting vehicle supporting position and a retracted general horizontal position. The invention relates more particularly to a kickstand of this general type wherein the kickstand attachment may be universally adjusted relative to the vehicle frame so that the support arm assumes an effective supporting position notwithstanding the various angular orientations of the rear fork portion of the vehicle frame, its cross sectional shape, and its height above the ground.

Kickstands commonly used with two-wheeled vehicles, such as bicycles, motorcycles and the like, are usually designed to be secured to the rear fork of the cycle just forwardly of the rear wheel. Conventional kickstands include a pair of clamp members which clamp the usual pair of rear fork members therebetween and the support arm is pivoted on a generally transverse axis to a bracket portion of the lower clamp member. A spring and cam arrangement carried by the bracket portion retains the support arm in either a vehicle supporting position or a retracted generally horizontal position.

Vehicles made by different manufactures have variously formed fork members both as to cross sectional configuration and as to their direction of extent relative to the horizontal. If the fork members are inclined to the horizontal, the support arm of a conventional kickstand, when moved into supporting position as defined by its cam, will be inclined away from a correct supporting position in a fore and aft direction.

Since fork members, particularly the portions thereof to which kickstands are usually attached, are at different heights from the ground in bicycles of various sizes and designs, the support arm of a given kickstand will not satisfy these widely varying requirements. Variations in the cross sections of fork members of different vehicles, such as flattened or elliptical cross sections, present further difficulties in mounting conventional kickstands and the varying fork angles, cross sectional configurations, and height from the ground necessitate providing a great number of kickstand styles and sizes to suit various bicycles and similar vehicles.

A further problem resides in the fact that in conventional kickstands the support arms have fixed angular relation with repect to the mounting bracket when the support arms are retracted. This also requires a number of different kickstand styles to suit various bicycle frames.

A kickstand constructed in accordance with the present invention obviates the foregoing difficulties and provides a kickstand adapted for attachment to variously inclined frame members and frame members of various heights, the attachment portion of the kickstand being universally adjustable relative to the frame of the vehicle to present the support arm in proper vehicle supporting position and proper retracted position over a wide range of frame constructions, both as to inclination or cant of the fork members and the divergence thereof, and with the frame members of various heights.

The present kickstand provides a bracket having a spring and cam arrangement defining the supporting and retracted positions of the support arm with the bracket universally connected to a pair of clamp members which fasten the kickstand to the vehicle frame members, such as the rear fork members of a bicycle. The bracket may be selectively and universally adjusted relative to the frame members to orient the pivotal axis of the support arm in various directions to position the arm in correct supporting position. These adjustments compensate for the particular inclination or cant of the frame members, varying heights of frame members, and varying divergence of the fork members, and makes the present kickstand interchangeable among the wide variety of bicycles and similar vehicles.

The present kickstand may also be readily clamped to frame members having various cross-sectional configurations. In accordance with the invention, interchangeable adaptor plates are provided which have variously contoured edges for secure engagement against variously contoured frame members.

Other novel features of construction and advantages inherent in the kickstand construction of the present invention are pointed out in detail in the following description of a typical embodiment thereof and are illustrated in the accompanying drawing depicting the same wherein like numerals represent like parts throughout the various views.

In the drawing:

FIG. 1 is an end elevational view of a kickstand constructed in accordance with one form of the present invention shown attached to the rear fork of a bicycle;

FIG. 2 is a fragmentary, transverse sectional view thereof, viewed as in FIG. 1 but on an enlarged scale;

FIG. 3 is a fragmentary side elevational view, viewed from the left of FIG. 2;

FIG. 4 is a bottom perspective view of a lower clamp member;

FIG. 5 is a perspective view of an adaptor plate for use with the lower clamp member; and FIG. 6 is a perspective view of a locking washer employed in the clamp structure.

Referring to the drawing and in particular to FIGS. 1 and 2, a kickstand constructed in accordance with the present invention is generally designated 10 and comprises a bracket 11, a support arm 12 pivotally carried by bracket 11, upper and lower clamp members 13 and 14 respectively, a pair of adaptor plate members 15, and a bolt 16 for fastening kickstand 10 to a pair of rear fork members 17 forming a part of the lower frame of a two-wheeled vehicle, such as a bicycle or motorcycle.

Bracket 11 includes a hollow hemispherical portion 18 having a central upper opening 19 and a pair of depending diametrically opposed bearing flanges 20 and 21 having transverse axially aligned bearing openings therethrough. Arm 12 comprises a generally Z-shaped rod having an upper leg portion 23 engaging through the bearing openings in flanges 20 and 21 whereby arm 12 is rotatable between operative and retracted positions.

Flange 20 has a pair of cam grooves 24 and 25 which extend downwardly and rearwardly, respectively, along its outer face for retaining arm 12 in either its operative or retracted position.

Upper leg portion 23 of arm 12 is biased toward the retaining grooves 24 and 25 by an encircling compression spring 27. One end of spring 27 bears against the inner face of flange 20 and the other end engages against washers 28 which abut a cotter pin 29 which passes through leg portion 23 adjacent its outer end.

Lower clamp member 14 has a central opening 30 with a raised peripheral portion 31 and the underneath convex side of portion 31 is serrated to form a seat 32 for engagement upon hemispherical portion 18 of bracket 11. Lower clamp member 14 may be shaped to engage the fork members 17 directly but in the present instance slots 33 are formed at opposite sides of clamp member 14 for receiving depending tabs 34 of adaptor plate members 15 which are shown in detail in FIG. 5. The upper edges 36 of adaptor plates 15 are contoured to provide seats for the fork members 17. In the illustrated form, upper edge 36 of each plate member 15 has a pair of shallow, V-shaped notches (FIGS. 2 and 5) for receiving fork members 17 which have generally circular cross sections. It is to be understood that additional pairs of adaptor plate members 15 having differently contoured upper edges may be provided to fit frame members having various other cross-sections and spacings.

Upper clamp 13 has arcuate side edge formations 39 for clamping against fork members 17 and preventing lateral displacement of the clamp when the kickstand is secured to a vehicle. Clamp 13 has a medial raised portion 40 with a central opening for receiving a bolt 16. A convex washer 45 has a serrated spherical upper surface 46, as best seen in FIG. 6, for engaging against the underside of hemispherical portion 18 of bracket 11 and is provided with a square aperture 47 for receiving a squared portion 48 of bolt 16. Bolt 16 passes upwardly through aperture 47 and the openings in bracket 11 and the clamp members and nut 50 clamps the assembly with respect to fork members 17.

From the foregoing it will be noted that, with nut 50 loosened, the bracket 11 may be rocked relative to lower clamp 14 about any horizontal axis through the center of spherical formation 18 by sliding movement between the exterior of spherical formation 18 and the undersurface of seat 32 of lower clamp member 14. The bracket 11 may also be adjusted about a generally vertical axis by relative rotary movement between these parts.

Adjustment by relative rotary movement on a vertical axis permits the axis of leg 23 of arm 12 to be adjusted in a generally horizontal plane. Thus, by disposing such axis obliquely with the outer end thereof, the right-hand end as viewed in FIGS. 1 and 2, in a more forward position than the left-hand end which merges into arm 12 proper, arm 12 is caused to swing from an outwardly projecting supporting position, generally as shown in FIG. 1, to a retracted generally horizontal position where it extends generally along the general line of the overlying fork member.

The rocking adjustment of bracket 11 on any desired horizontal axis by reason of spherical formation 18 and seat 32 is utilized in the following manner. If the fork members 17 extend upwardly or downwardly, rather than horizontally, at the point where clamp members 13 and 14 engage the same, bracket 11 will be rocked about a transverse horizontal axis to insure that support arm 12 extends directly downwardly in a vertical direction as viewed from the side, as in FIG. 3.

Furthermore, adjustment may be effected to vary the degree of lateral divergence of support arm 12 when such arm is in the supporting position of FIG. 1. This accommodates for variations in the height of the fork members 17 above the ground by, in effect, lengthening or shortening the effective vertical height of support arm 12. This is accomplished by relative rocking movement of bracket 11 on a longitudinal horizontal axis. When bracket 11 is adjusted to suit all of the foregoing varying conditions, nut 50 is securely tightened to maintain the desired relative positions of the various parts. When nut 50 is tightened the engagement of the serrations of washer 45 and seat 32 against opposite lower and upper surfaces of hemispherical portion 18, respectively, prevents displacement of bracket 11 from its adjusted angular position. Complementary serrations may also be provided along the upper and lower surfaces of hemispherical portion 18 for more secure clamping.

Having thus described and illustrated a preferred form of my invention, it will be understood that such description and illustration is by way of example only and that such modifications and changes as may suggest themselves to those skilled in the art are intended to fall within the scope of the present invention which is limited only by the appended claims.

I claim:

1. A kickstand comprising a bracket, a support arm pivoted to said bracket for swinging movement about a generally transverse axis between a downwardly and outwardly extending vehicle supporting position and a generally horizontally extending retracting position, means releasably retaining said support arm in either of said positions, and clamp means for detachably securing said bracket to a vehicle frame, means connecting said clamp means and said bracket for relative pivotal adjustment about a generally vertical axis, said bracket and said clamp means having cooperating parts providing for rocking movement of said bracket to adjust the same relative to said clamp about a generally horizontal axis.

2. A kickstand according to claim 1 including means operable to jointly tighten said clamp means and secure said cooperating parts in selected relative positions with respect to said horizontal axis.

3. A kickstand according to claim 1 wherein said cooperating parts provide said rocking movement about a plurality of angularly related horizontal axes.

4. A kickstand according to claim 3 including means operable to jointly tighten said clamp means and secure said cooperating parts in adjusted positions relative to said horizontal axes.

5. A kickstand according to claim 1 wherein said cooperating parts comprise a ball and socket joint to provide said rocking movement about a horizontal axis in any direction.

6. A kickstand according to claim 5 including means operable to jointly secure said clamp means and said cooperating parts.

7. A kickstand according to claim 5 wherein one of said cooperating parts comprises a spherical surface having a central aperture therethrough and the other part has an opening forming a seat for engaging against said spherical surface, and securing means including a bolt engaging said clamp means and passing through said aperture and said opening to jointly secure said clamp means and said ball and socket joint.

8. A kickstand according to claim 1 including means operable to jointly secure said clamp means to said vehicle frame and secure said horizontal and vertical pivotal adjustments.

9. A kickstand according to claim 1 wherein said clamp means comprises a pair of clamp members for engaging about said vehicle frame and adaptor means interchangeably attached to one of said clamp members and contoured to engage securely against said frame.

10. A kickstand according to claim 1 wherein said bracket is adjustable relative to said clamp about horizontal axes at right angles to each other.

11. A kickstand comprising a bracket, a support arm pivoted to said bracket for swinging movement about a generally transverse axis between a downwardly and outwardly extending vehicle supporting position and a generally horizontally extending retracted position, means releasably retaining said support arm in either of said positions, and clamp means for detachably securing said bracket to a vehicle frame, said bracket and said clamp means having cooperating parts pivoted on a substantially vertical axis for adjustment of said bracket to adjust the direction of the pivot axis of said support arm in a generally horizontal plane to adjust the plane of movement of said support arm and thus vary the direction of extend of said arm in supporting and retracted positions, said clamp means comprising a pair of clamp members for engaging about said vehicle frame and adaptor means interchangeably attached to one of said clamp members and contoured to engage securely against said frame.

References Cited

UNITED STATES PATENTS

| | | | |
|---|---|---|---|
| 1,280,013 | 9/1918 | Goddard | 248—181 |
| 2,229,551 | 1/1941 | Cohen | 280—301 |
| 2,244,089 | 6/1941 | Swartz | 248—181 |
| 2,308,794 | 1/1943 | Thompson | 280—301 |
| 2,388,308 | 11/1945 | Court | 280—150.5 |

FOREIGN PATENTS 762,828  12/1956  Great Britain.

KENNETH H. BETTS, *Primary Examiner.*

U.S. Cl. X.R.

248—181